US012566980B2

(12) United States Patent
Lee et al.

(10) Patent No.: US 12,566,980 B2
(45) Date of Patent: Mar. 3, 2026

(54) SYSTEM AND METHOD HAVING THE ARTIFICIAL INTELLIGENCE (AI) ALGORITHM OF K-NEAREST NEIGHBORS (K-NN)

(71) Applicant: AIRIS LABS SDN BHD, Pulau Pinang (MY)

(72) Inventors: Weng Fook Lee, Pulau Pinang (MY); Chun Keat Lee, Pulau Pinang (MY); Wan Ying Loh, Pulau Pinang (MY)

(73) Assignee: AIRIS LABS SDN BHD, Pulau Pinang (MY)

( * ) Notice: Subject to any disclaimer, the term of this patent is extended or adjusted under 35 U.S.C. 154(b) by 1393 days.

(21) Appl. No.: 17/166,158

(22) Filed: Feb. 3, 2021

(65) Prior Publication Data

US 2022/0129772 A1    Apr. 28, 2022

(30) Foreign Application Priority Data

Oct. 27, 2020    (MY) .......................... PI 2020005624

(51) Int. Cl.
G06N 5/04        (2023.01)
G06N 20/00      (2019.01)

(52) U.S. Cl.
CPC .............. G06N 5/04 (2013.01); G06N 20/00 (2019.01)

(58) Field of Classification Search
CPC ................................. G06N 5/04; G06N 20/00
See application file for complete search history.

(56) References Cited

U.S. PATENT DOCUMENTS

| | | | |
|---|---|---|---|
| 10,073,887 B2 * | 9/2018 | Chehreghani | ........... G06F 16/22 |
| 2015/0186458 A1 * | 7/2015 | Gupta | ............... G06F 16/90335 |
| | | | 707/769 |
| 2016/0155048 A1 * | 6/2016 | McCormick | ............. G06N 3/04 |
| | | | 706/27 |
| 2016/0156460 A1 | 6/2016 | Feng et al. | |
| 2017/0011091 A1 | 1/2017 | Chehreghani et al. | |
| 2017/0140012 A1 * | 5/2017 | Bortnikov | ............ G06V 10/763 |
| 2017/0193078 A1 * | 7/2017 | Limonad | ............... G06F 21/552 |
| 2019/0042925 A1 * | 2/2019 | Choe | ...................... G06N 3/063 |
| 2021/0099442 A1 * | 4/2021 | Jayaraman | .......... H04L 63/0861 |

OTHER PUBLICATIONS

Selvaluxmiy et al. ("Accelerating k-NN Classification Algorithm Using Graphics Processing Units", 2016 IEEE) (Year: 2018).*

(Continued)

*Primary Examiner* — Imad Kassim

(74) *Attorney, Agent, or Firm* — RABIN & BERDO, P.C.

(57)                    ABSTRACT

The present invention relates to a system and method having the Artificial Intelligence (AI) algorithm of k-Nearest Neighbors (k-NN) as logic gates and SRAM/DRAM/non-volatile memory. One of the advantages of the system is that it utilizes a low power consumption. This is compared to few watts power consumption for existing AI platform available in the market The system of the present invention is also very efficient as it does not need CPU or GPU to do the intensive calculation, as it is fully logic design. In addition, the system of the present invention is also low in cost due to small die size as it does not require any CPU or GPU to perform the intensive computation.

11 Claims, 15 Drawing Sheets

(56)         References Cited

OTHER PUBLICATIONS

Zhang et al. ("Efficient kNN Classification With Different Numbers of Nearest Neighbors", IEEE, vol. 29, No. 5, May 2018) (Year: 2018).*

Sismanis et al. ("Parallel Search of k-Nearest Neighbors with Synchronous Operations", 2012 IEEE) (Year: 2012).*

Saikia et al. ("K-Nearest Neighbor Hardware Accelerator Using In-Memory Computing Sram", IEEE Xplore: Sep. 5, 2019) (Year: 2019).*

Lee et al. ("Application Codesign of Near-Data Processing for Similarity Search", 2018 IEEE) (Year: 2018).*

* cited by examiner

FIG. 4

Control Block

Distancetype Register

Rowsize Register

Columnsize Register

Threshold Register

| | | | | |
|---|---|---|---|---|
| Learning data sample1 | Sample 1, Attribute 1 | ... | ... | Sample 1, Attribute 1024 |
| Learning data sample2 | Sample 2, Attribute 1 | ... | ... | Sample 2, Attribute 1024 |
| Learning data sample3 | Sample 3, Attribute 1 | ... | ... | Sample 3, Attribute 1024 |
| Learning data sample4 | Sample 4, Attribute 1 | ... | ... | Sample 4, Attribute 1024 |

| | | | | |
|---|---|---|---|---|
| Learning data sample1021 | Sample 1021, Attribute 1 | ... | ... | Sample 1021, Attribute 1024 |
| Learning data sample1022 | Sample 1022, Attribute 1 | ... | ... | Sample 1022, Attribute 1024 |
| Learning data sample1023 | Sample 1023, Attribute 1 | ... | ... | Sample 1023, Attribute 1024 |
| Learning data sample1024 | Sample 1024, Attribute 1 | ... | ... | Sample 1024, Attribute 1024 |

FIG. 5

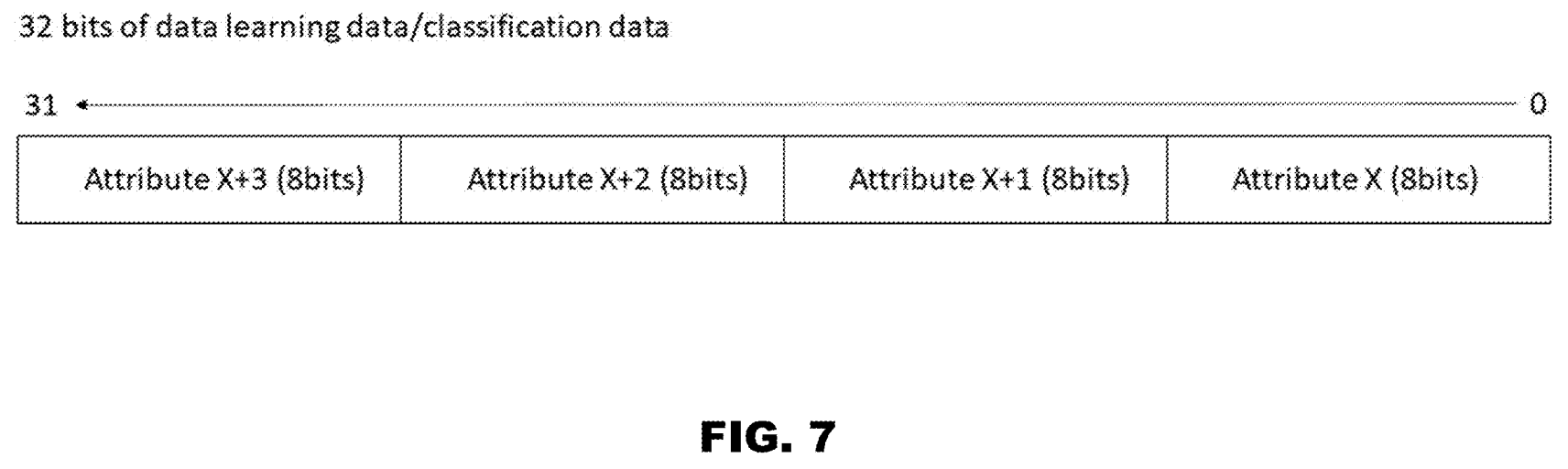

32 bits of data learning data/classification data

| Attribute X+3 (8bits) | Attribute X+2 (8bits) | Attribute X+1 (8bits) | Attribute X (8bits) |
|---|---|---|---|

FIG. 7

AI identifying and classifying the object

AI learning data

AI ASIC chip beginning of AI object identification and classification after complete learning AI chip completes object identification and classification. Results are generated from the AI chip

SYSTEM AND METHOD HAVING THE ARTIFICIAL INTELLIGENCE (AI) ALGORITHM OF K-NEAREST NEIGHBORS (K-NN)

FIELD OF THE INVENTION

The present invention relates to a system and method having the Artificial Intelligence (AI) algorithm of k-Nearest Neighbors (k-NN) as logic gates and SRAM/DRAM/non-volatile memory.

BACKGROUND OF THE INVENTION

AI (Artificial Intelligence) algorithms are available, among others KNN (K Nearest Neighbor), CNN (Convolutional Neural Network), Decision Tree, Forest Tree, Naïve Bayes and others. In most occasions, these algorithms are programmed to run on CPU (Central Processing Unit) or NPU (Neural Processing Unit) or TPU (Tensor Processing Unit) and GPU (Graphics Processing Unit). When the AI computations are getting complex, there is a need to program the algorithms into CPU/NPU/TPU and GPUs. For example, the Nvidia Jetson Nano is an AI system utilizing Quad-core ARM® Cortex®-A57 MPCore processor with 128 NVIDIA CUDA® GPU cores. AI algorithms are programmed using C++ or Python and the software executed on the AI system.

However, such existing AI system is costly, power consuming and high total cost of ownership (TCO). In most instances, AI system implementation is required a combination of CPU with GPU. The more intensive AI calculations, the more CPUs and GPUs are required. The AI system can run on large servers in the cloud which have large amounts of CPUs and GPUs forming large computation servers. Alternatively, the AI system can run on EDGE devices with localized CPU and GPU such as the example mentioned above Nvidia Jetson Nano. Whether its cloud computation or EDGE computation, such AI system requires high clock speed for the CPU and GPU to make the necessary software calculations, for example the mentioned Nvidia Jetson Nano runs at 1.43 GHz. This results in large power consumption. Moreover, it is costly as it requires combination of CPU and many GPUs to complete the required computation.

Prior Art, thesis dissertation (AN FPGA-BASED HARDWARE ACCELERATOR FOR K-NEAREST NEIGHBOR CLASSIFICATION FOR MACHINE LEARNING) by Mohsin, Mokhles Aamel (2017) disclosed a hardware architecture to accelerate the K-NN algorithm, while addressing the associated requirements and constraints. The hardware architecture is designed and developed on an FPGA-based (Field Programmable Gate Array-based) development platform. In addition, the author evaluated our hardware architecture, in terms of speed-performance, space, and accuracy as well as the hardware architecture is also evaluated with its software counter-part running on the same development platform. The author found that proposed hardware is significantly faster, for instance, our hardware architecture executed up to 127 times faster than its software counter-part. However, in view that hardware architecture to accelerate the K-NN algorithm on FPGA, its using prefetch, memory is external, it is slow and inefficient. FPGA is faster than using GPU/CPU/NPU/TPU or combination of it, but FPGA is still significantly slower than ASIC (application-specific integrated circuit). Another weakness of FPGA is that FPGA have limited resources and limited memory elements, thus putting the entire design into FPGA is not feasible. For example, the proposed AI in this invention if consisting of 1024 learning data with each learning data of 1024 attributes cannot be placed into any FPGA in the market. To fit it into FPGA, the proposed AI in this invention is scaled down to 100 learning data with each learning data of 128 attributes. This is significantly smaller learning data as compared to ASIC due to the weakness of FPGA having limited resources and limited memory elements.

In view of the above shortcomings, the present invention aims to provide a system and method having the Artificial Intelligence (AI) algorithm of k-Nearest Neighbors (k-NN) as logic gates and SRAM/DRAM/non-volatile memory. A new architecture of the memory for the learning data and identification object data to the calculation with sorting algorithm is provided of the present invention. A state machine is further provided for controlling the logic to achieve the process of calculation. In addition, such system can be conveniently installed and maintained in a simple technical process, low cost with high efficiency.

SUMMARY OF THE INVENTION

The present invention provides a system comprising a memory block having a memory array for storing a training data and an intermediate calculation data; wherein the memory array further comprising a learning data memory block for storing a learning data and a corresponding object for identification each learning data; and a classification data memory block for storing a classification data; a calculation block having a K-Nearest Neighbor (KNN) algorithm logic to calculate distances between input data to be determined by a user and the learning data from the memory block wherein the distances are stored in the memory block; a sorting block is provided to sort an array of information generated from the learning data and to utilize an input K value provided by the user to determine a most suitable result of K-Nearest Neighbor (KNN) algorithm; and a control block having a plurality of control registers for allowing the user to control a learning data.

In one of the embodiment of the present invention wherein the memory array further comprising a distance storage of a register memory block for storing a temporary result of an attribute calculation; a distance storage of the memory block to store a temporary calculated distance for each of a sample; a distance position of the memory block to store a temporary position of the distance register calculated distance for each of a sample; and a class storage of the memory block to store a temporary class for each corresponding sample.

In another of the embodiment of the present invention. wherein a distance metric is provided in the calculation block to determine a distance based on a set of register values provided by the user and the control block further allowing the user to control the attributes width of each sample of the learning data and a selection of distance calculation.

In yet another embodiment of the present invention, wherein at least one machine learning technique is implemented by the Artificial Intelligence communication interface to process the state machine information includes k-Nearest Neighbors (k-NN).

A system of the present invention further comprising a processor communicatively coupled to the memory block, the processor configured to implement: a state machine that is configured to implement an instance of a workflow to facilitate an execution calculation distance between an input data of object to be determined and a learning data from a memory block and to sort an array of information and utilize an input K value by a user to determine a suitable result of the K-Nearest Neighbor (KNN) algorithm; and an Artificial Intelligence communication interface communicatively coupled to the memory block and the state machine, configured to receive state machine information from the state machine and implement at least one machine learning technique to process the state machine information to determine state machine observation information regarding a behavior or a status of the state machine.

The state machine further comprising a first state machine to implement a first instance of a workflow to facilitate an execution calculation distance between an input data of object to be determined and a learning data from a memory block and to sort an array of information and utilize an input K value by a user to determine a suitable result of the K-Nearest Neighbor (KNN) algorithm, the first state machine comprising: a first plurality of work units to execute first respective computer-related actions relating to the execution calculation distance between an input data of object to be determined and a learning data from a memory block and to sort an array of information and utilize an input K value by a user to determine a suitable result of the K-Nearest Neighbor (KNN) algorithm, the first plurality of work units respectively triggered by a corresponding plurality of first state machine events and having a corresponding plurality of first state machine outcome states; and a second state machine to implement a second instance of a workflow to facilitate an execution calculation distance between an input data of object to be determined and a learning data from a memory block and to sort an array of information and utilize an input K value by a user to determine a suitable result of the K-Nearest Neighbor (KNN) algorithm, the second state machine comprising: a second plurality of work units to execute first respective computer-related actions relating to the execution calculation distance between an input data of object to be determined and a learning data from a memory block and to sort an array of information and utilize an input K value by a user to determine a suitable result of the K-Nearest Neighbor (KNN) algorithm, the second plurality of work units respectively triggered by a corresponding plurality of second state machine events and having a corresponding plurality of second state machine outcome states; and wherein at least one of the plurality of first state machine events in the first state machine is based on the second state machine being in one of the plurality of second state machine outcome states.

In another embodiment of the present invention, wherein the sort an array of information and utilize an input K value by a user to determine a suitable result of the K-Nearest Neighbor (KNN) algorithm is configured to sorting from ascending order to determine a smallest of the two distance values between an input data of object to be determined and a learning data; comparing the two distance values on a first smallest value and a second smallest value; and repeating the steps of sorting and comparing until all the distance values are identified based on the input K value.

In an alternative embodiment of the present invention wherein the sort an array of information and utilize an input K value by a user to determine a suitable result of the K-Nearest Neighbor (KNN) algorithm is configured to sorting from descending order to determine a smallest of the two distance values between an input data of object to be determined and a learning data; comparing the two distance values on a first smallest value and a second smallest value; and repeating the steps of sorting and comparing until all the distance values are identified based on the input K value. The system of the present invention is implemented in an application-specific integrated circuit (ASIC).

A method comprising activating a memory array of a memory block having a learning data memory block and a classification data memory block;

determining learning data, attributes width of each sample learning data and choice of distance calculation in a control block by a user;

determining a threshold value for K-Nearest Neighbors (k-NN) classification;

providing input data to the memory array by the user;

calculating distances between input data to be determined by the user and the learning data from the memory block; and sorting an array of information generated from the learning data and to utilize an input K value provided by the user to determine a most suitable result of K-Nearest Neighbor (KNN) algorithm.

The step of sorting an array of information generated from the learning data and to utilize an input K value provided by the user to determine a most suitable result of K-Nearest Neighbor (KNN) algorithm further comprising sorting from ascending order to determine a smallest of the two distance values between an input data of object to be determined and a learning data;

comparing the two distance values on a first smallest value and a second smallest value; and repeating the steps of sorting and comparing until all the distance values are identified based on the input K value.

In another embodiment of the present invention, wherein the step sorting an array of information generated from the learning data and to utilize an input K value provided by the user to determine a most suitable result of K-Nearest Neighbor (KNN) algorithm further comprising sorting from descending order to determine a smallest of the two distance values between an input data of object to be determined and a learning data;

comparing the two distance values on a first smallest value and a second smallest value; and repeating the steps of sorting and comparing until all the distance values are identified based on the input K value.

A processor communicatively coupled to the memory block, the processor configured to implement: a state machine that is configured to implement an instance of a workflow to facilitate an execution calculation distance between an input data of object to be determined and a learning data from a memory block and to sort an array of information and utilize an input K value by a user to determine a suitable result of the K-Nearest Neighbor (KNN) algorithm; and an Artificial Intelligence communication interface communicatively coupled to the memory block and the state machine, configured to receive state machine information from the state machine and implement at least one machine learning technique to process the state machine information to determine state machine observation information regarding a behavior or a status of the state machine.

Meanwhile, the state machine further comprising a first state machine to implement a first instance of a workflow to facilitate an execution calculation distance between an input data of object to be determined and a learning data from a memory block and to sort an array of information and utilize an input K value by a user to determine a suitable result of the K-Nearest Neighbor (KNN) algorithm, the first state machine comprising:

a first plurality of work units to execute first respective computer-related actions relating to the execution calculation distance between an input data of object to be determined and a learning data from a memory block and to sort an array of information and utilize an input K value by a user to determine a suitable result of the K-Nearest Neighbor (KNN) algorithm, the first plurality of work units respectively triggered by a corresponding plurality of first state machine events and having a corresponding plurality of first state machine outcome states; and a second state machine to implement a second instance of a workflow to facilitate an execution calculation distance between an input data of object to be determined and a learning data from a memory block and to sort an array of information and utilize an input K value by a user to determine a suitable result of the K-Nearest Neighbor (KNN) algorithm, the second state machine comprising:

a second plurality of work units to execute first respective computer-related actions relating to the execution calculation distance between an input data of object to be determined and a learning data from a memory block and to sort an array of information and utilize an input K value by a user to determine a suitable result of the K-Nearest Neighbor (KNN) algorithm, the second plurality of work units respectively triggered by a corresponding plurality of second state machine events and having a corresponding plurality of second state machine outcome states; and wherein at least one of the plurality of first state machine events in the first state machine is based on the second state machine being in one of the plurality of second state machine outcome states.

A non-transitory computer readable storage medium including instructions that, when executed by a processing device, cause the processing device to perform operations comprising:

activating a memory array of a memory block having a learning data memory block and a classification data memory block;

determining learning data, attributes width of each sample learning data and choice of distance calculation in a control block by a user;

determining a threshold value for K-Nearest Neighbors (k-NN) classification;

providing input data to the memory array by the user;

calculating distances between input data to be determined by the user and the learning data from the memory block; and sorting an array of information generated from the learning data and to utilize an input K value provided by the user to determine a most suitable result of K-Nearest Neighbor (KNN) algorithm.

The non-transitory computer readable storage medium wherein the step sorting an array of information generated from the learning data and to utilize an input K value provided by the user to determine a most suitable result of K-Nearest Neighbor (KNN) algorithm further comprising sorting from ascending order to determine a smallest of the two distance values between an input data of object to be determined and a learning data;

comparing the two distance values on a first smallest value and a second smallest value; and repeating the steps of sorting and comparing until all the distance values are identified based on the input K value.

The non-transitory computer readable storage medium wherein the step sorting an array of information generated from the learning data and to utilize an input K value provided by the user to determine a most suitable result of K-Nearest Neighbor (KNN) algorithm further comprising sorting from descending order to determine a smallest of the two distance values between an input data of object to be determined and a learning data;

comparing the two distance values on a first smallest value and a second smallest value; and repeating the steps of sorting and comparing until all the distance values are identified based on the input K value.

The non-transitory computer readable storage medium wherein a processor communicatively coupled to the memory block, the processor configured to implement:

a state machine that is configured to implement an instance of a workflow to facilitate an execution calculation distance between an input data of object to be determined and a learning data from a memory block and to sort an array of information and utilize an input K value by a user to determine a suitable result of the K-Nearest Neighbor (KNN) algorithm; and an Artificial Intelligence communication interface communicatively coupled to the memory block and the state machine, configured to receive state machine information from the state machine and implement at least one machine learning technique to process the state machine information to determine state machine observation information regarding a behavior or a status of the state machine.

In the non-transitory computer readable storage medium, the state machine further comprises:

a first state machine to implement a first instance of a workflow to facilitate an execution calculation distance between an input data of object to be determined and a learning data from a memory block and to sort an array of information and utilize an input K value by a user to determine a suitable result of the K-Nearest Neighbor (KNN) algorithm, the first state machine comprising:

a first plurality of work units to execute first respective computer-related actions relating to the execution calculation distance between an input data of object to be determined and a learning data from a memory block and to sort an array of information and utilize an input K value by a user to determine a suitable result of the K-Nearest Neighbor (KNN) algorithm, the first plurality of work units respectively triggered by a corresponding plurality of first state machine events and having a corresponding plurality of first state machine outcome states; and a second state machine to implement a second instance of a workflow to facilitate an execution calculation distance between an input data of object to be determined and a learning data from a memory block and to sort an array of information and utilize an input K value by a user to determine a suitable result of the K-Nearest Neighbor (KNN) algorithm, the second state machine comprising:

a second plurality of work units to execute first respective computer-related actions relating to the execution calculation distance between an input data of object to be determined and a learning data from a memory block and to sort an array of information and utilize an input K value by a user to determine a suitable result of the K-Nearest Neighbor (KNN) algorithm, the second plurality of work units respectively triggered by a corresponding plurality of second state machine events and having a corresponding plurality of second state machine outcome states; and wherein at least one of the plurality of first state machine events in the first state machine is based on the second state machine being in one of the plurality of second state machine outcome states.

One of the advantages of the system is that it utilizes a low power consumption. For instance, a chip of QFN88 package, TSMC40LP fab process, at 3.3V IO, 1.1V Core, power consumed in typical room temperature is only 0.121 W for learning 1 Mbyte data of 1024 learning data with 1024 attributes per learning data and 0.144 W for classification of 1 test object based on the 1 Mbyte of learned data. This is compared to few watts power consumption for existing AI platform available in the market (example Nvidia Jetson Nano have a rating of 5 W (Reference—https://developer.n-vidia.com/embedded/jetson-nano-developer-kit). The system of the present invention is also very efficient as it does not need CPU or GPU to do the intensive calculation, as it is fully logic design, it is able to achieve the computation with 100 MHz clock to achieve a 1 Mbyte of learning data classification in 0.7 ms at typical room temp, while the rest of the available AI platform in market runs at Gigahertz frequency. In addition, this slower clock speed contributes to low power consumption. In addition, the system of the present invention is also low in cost due to small die size (on TSMC40LP process the chip is 3.848 mm×3.848 mm only including Input/Output circuits (IO pads and bonding pads) as it does not require any CPU or GPU to perform the intensive computation.

Further advantages of the system in accordance with the invention and its application can be derived from the description and the accompanying drawings. The above-mentioned features and those to be further described below can be utilized in accordance with the invention individually or collectively in arbitrary combination. The embodiments mentioned are not to be considered exhaustive enumerations, rather have exemplary character. The invention is shown in the drawings and explained more closely with reference to embodiments.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates a register control of a control block in accordance with a preferred embodiment of the present invention.

FIG. 5 illustrates a memory map of learning data in accordance with a preferred embodiment of the present invention.

FIG. 7 illustrates a diagram having representation of 4 Attributes Per 32 Bits of Data in accordance with a preferred embodiment of the present invention.

DETAILED DESCRIPTIONS OF THE INVENTION

The present invention will now be described in detail in connection with specific embodiments with reference to the accompanying drawings. Unless the context requires otherwise, throughout the specification and claims which follow, the word "comprise" and variations thereof, such as, "comprises" and "comprising" are to be construed in an open, inclusive sense that is as "including, but not limited to". Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Figure 1:
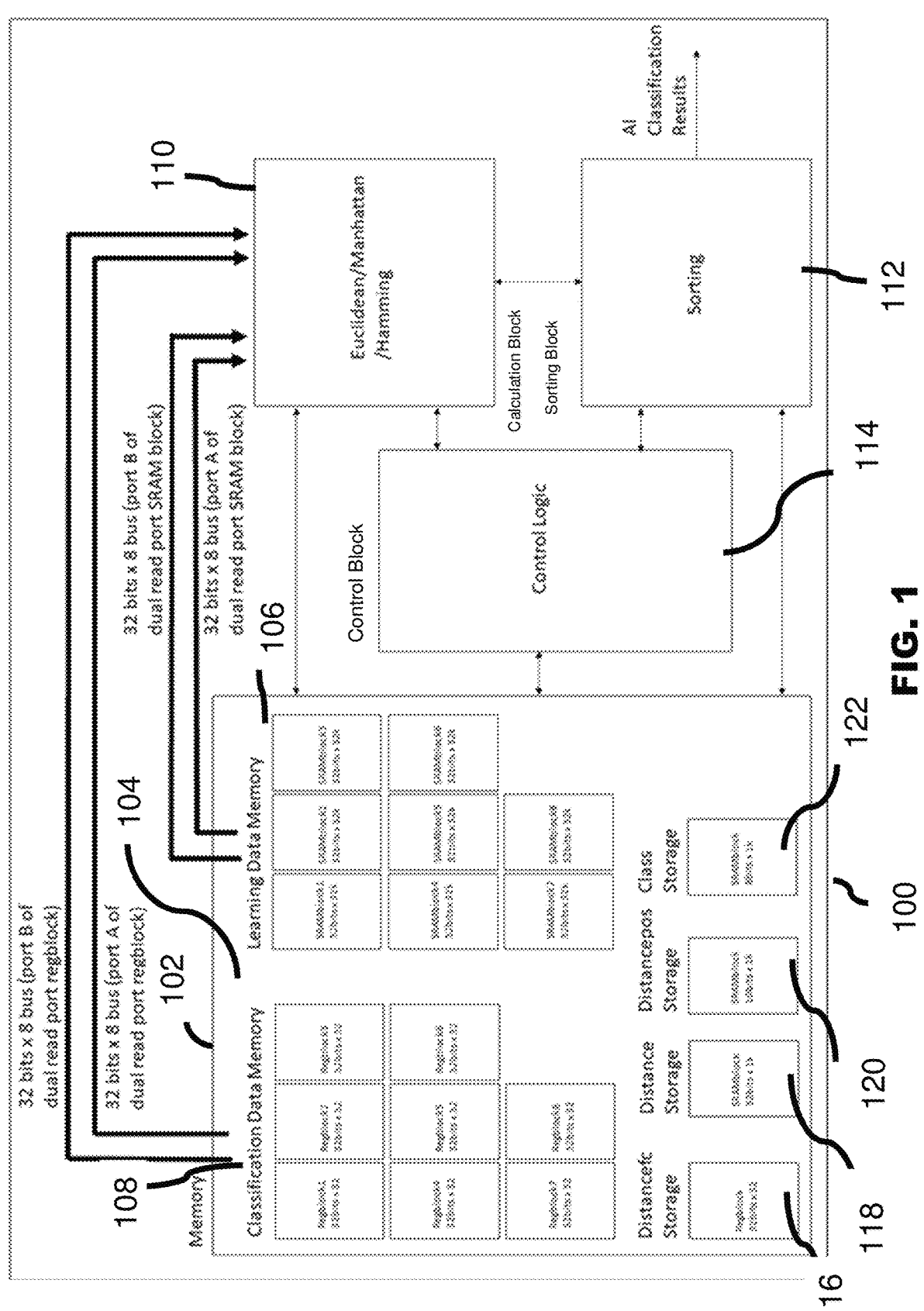
FIG. 1 illustrates a top-level architectural implementation of logical schematic illustrations of a memory computation device constructed and operative in accordance with a preferred embodiment of the present invention.

FIG. 1 illustrates a top-level architectural implementation of logical schematic illustrations of a memory computation device constructed and operative in accordance with a preferred embodiment of the present invention. A system (100) of the present invention comprising a memory block (102) having a memory array (104) for storing a training data and an intermediate calculation data. The memory array (104) further comprising a learning data memory block (106) for storing a learning data and a corresponding object for identification each learning data and a classification data memory block (108) for storing a classification data. A calculation block (110) having a K-Nearest Neighbor (KNN) algorithm logic to calculate distances between input data to be determined by a user and the learning data from the memory block (102) wherein the distances are stored in the memory block (102). A sorting block (112) is provided to sort an array of information generated from the learning data and to utilize an input K value provided by the user to determine a most suitable result of K-Nearest Neighbor (KNN) algorithm. A control block (114) having a plurality of control registers for allowing the user to control a learning data.

For example, a memory block comprises of memory, which is SRAM or DRAM or other forms of memory, that used to store the training data set and the intermediate calculation data from both calculation block and sorting block. The learning data preferably is stored in 8 SRAM blocks of 32 bits×32k. As memory compiler for SRAM in ASIC is commonly limited to 32 bits×8k, those 32 bits×32k SRAM block comprises of four 32 bits×8k with multiplex addressing to form the 32 bits×32k SRAM block. The 8 SRAM blocks form a 1 Mbyte of learning data capability. With each learning data at 8 bits, this is equivalent to 1,048,576 learning data capability. The object for identification is stored as 8 register blocks with each register block of 32 bits×32. As the learning data SRAM block holds 1024 samples with each sample of maximum 1024 attributes, the corresponding object for identification is represented using maximum of 1024 attributes as well.

The memory array (104) of the present system further comprises a distance storage of a register memory block (116) for storing a temporary result of an attribute calculation, a distance storage of the memory block (118) to store a temporary calculated distance for each of a sample, a distance position of the memory block (120) to store a temporary position of the distance register calculated distance for each of a sample and a class storage of the memory block (122) to store a temporary class for each corresponding sample. For instance, a distancefc storage of regblock of 32 bits×32 is used to store the 32 temporary results of attribute calculation. A distance SRAM block of 32 bits×1k is used to store the calculated distance for each of the sample, as there is maximum of 1024 samples, thus the distance SRAM block has 1024 storage with each being 32 bits. A distancepos SRAM block of 10 bits×1k is used to store the position of the distance register. As there is maximum of 1024 samples, thus there the distance SRAM block have 1024 storage with each being 10 bits represents the position of the distance register which can range from 1 to 1024, thus 10 bits is adequate to represent the number range of 1 to 1024. Preferably, a class storage SRAM block of 8 bits×1k is used to store the class for each corresponding sample, as there is maximum of 1024 samples, thus the class SRAM block have 1024 storage with each being 8 bits which allows for a maximum of 255 classes.

The calculation block (110) having a K-Nearest Neighbor (KNN) algorithm logic to calculate distances between input data to be determined by a user and the learning data from the memory block (102) wherein the distances are stored in the memory block (102). The architectural design of the system allows for implementation using Euclidean distance, Manhattan distance or Hamming distance based on a set of register values which the user can access to choose the distance used in the AI KNN calculation. The implementation is not limited to just these 3 methods of calculation, can be expanded further to include other calculations such as Minkowski distance, Chi square distance, cosine distance and others. To enhance the calculation, the architecture is implemented in 64 parallel paths. The architecture of the system of the present invention is versatile and can reduce to lesser pipes if the speed of calculation is not required to a person skilled in the art. For implementation requires a faster speed of calculation, the architecture can be implemented in more 64 parallel paths.

The Sorting Block sorts through the vast array of information generated from learning data. The Sorting Block determines the most suitable output data from those that identified as potential results by the AI KNN algorithm. Irrespective of the sample size and attribute size, the Sorting Block is able to sort through the information generated from learning the data and provide the potential result of the KNN algorithm.

Figure 2:
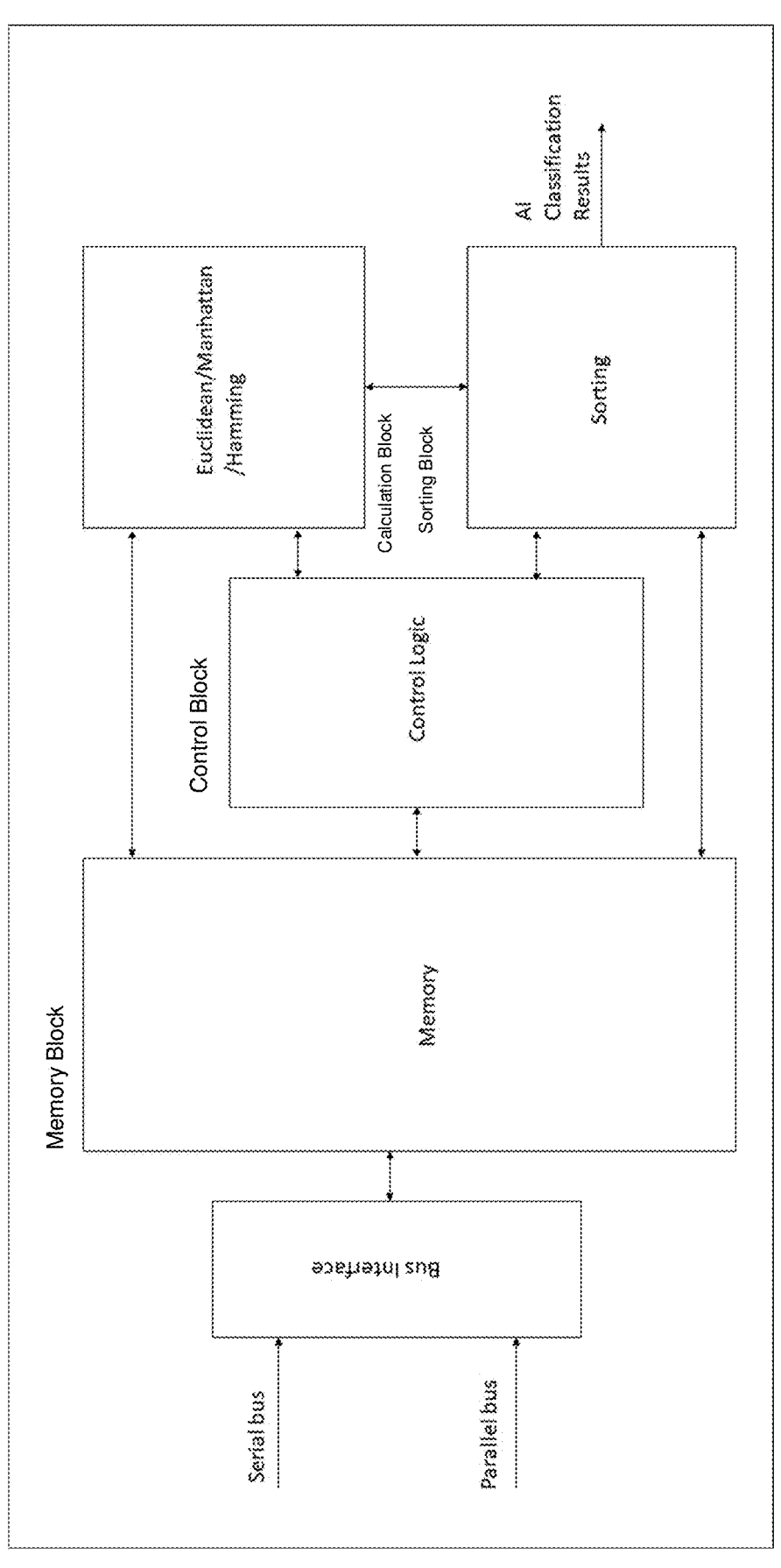
FIG. 2 illustrates a bus interface of logical schematic illustrations of a memory computation device constructed and operative in accordance with a preferred embodiment of the present invention.

FIG. 2 illustrates a bus interface of logical schematic illustrations of a memory computation device constructed and operative in accordance with a preferred embodiment of the present invention. The user of the system of the present invention provides input to the data into the design using parallel bus or serial bus. Parallel bus is a direct write in of learning data through a write enable signal, address bus and data bus. A serial bus can be in the form of SPI, I2C, SMBUS, USB or any other form of serial bus implementation. For example, the test chip, which was taped out on Dec. 23, 2019, have a memory size capable of learning data of 1024 samples with each sample having a maximum of 1024 attributes at a size of 1 Mbyte. However, this implementation is not limited to the said sample size, attribute size or memory size. The proposed modular architecture provides the flexibility for increasing or reducing the sample sizes, attribute sizes or memory sizes. For example, the architecture can be expanded to larger sample size of example 2048, 4096, 8192 or more samples with 64 attributes each sample, or 2048 samples with 1024 attributes, and other combinations.

Figure 3:
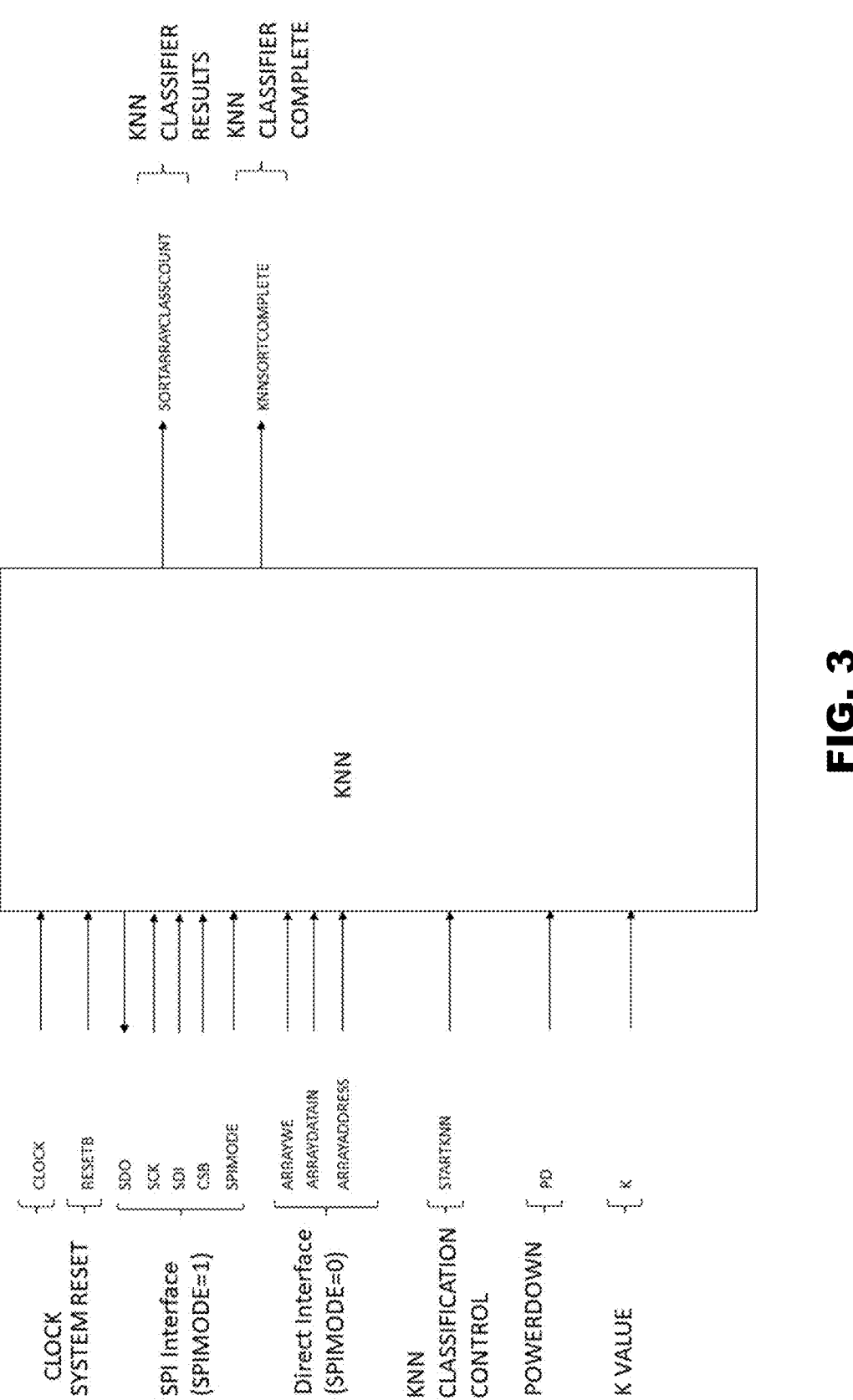
FIG. 3 illustrates a signal interface of logical schematic illustrations of a memory computation device constructed and operative in accordance with a preferred embodiment of the present invention.

FIG. 3 illustrates a signal interface of logical schematic illustrations of a memory computation device constructed and operative in accordance with a preferred embodiment of the present invention. The architecture, with parallel bus interface and serial interface which is shown as Serial Peripheral Interface (SPI). However, such design include other forms of serial interface such as I2C (Inter-Integrated Circuit), USB (Universal Serial Bus), System Management Bus (SMBus) and others as wherever applicable to a person skilled in the art.

Figure 4:
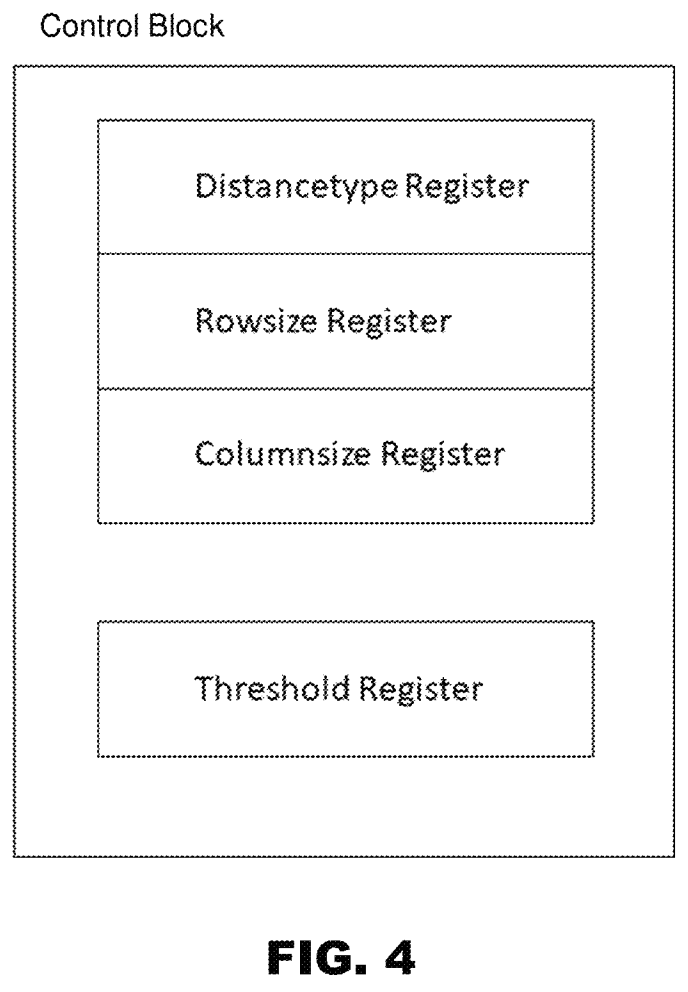

FIG. 4 illustrates a register control of a control block in accordance with a preferred embodiment of the present invention. The control block having different registers allowing user to control the amount of learning data samples, attributes width of each sample learning data and choice of distance calculation. Among others, a Rowsize Register allow users to control amount of samples for learning data, ranging from 2 to 1024. The Columnsize Register allows users to control the amount of attributes per sample learning data in multiples of 64, from 64, 128 to 1024. Meanwhile, the Distancetype Register allows users to control which calculation method to use for distance, current design is Euclidean, Manhattan and Hamming. While, the Threshold Register allows the user to set a threshold value to qualify the results of the KNN AI classification, thus allowing flexibility of validating of KNN classifier results. The function of the control block applies to ASIC, FPGA and SOC. For example, in FPGA implementation due to limited memory elements, an implementation of 12,800 bytes of learning data consisting of 100 samples with 128 attributes per sample, the Rowsize Register can range from 2 to 100, the Columnsize Register can range at 64 or 128, the Distancetype Register remains the same as choices of Euclidean, Manhattan or Hamming. For SOC, it is implemented in the proposed design as a block with other blocks in the SOC. Thus, the implementation in SOC is the same as in ASIC, meaning the Rowsize Register can range from 2 to 1024, Columnsize Register range in multiples of 64 from 64, 128 to 1024, Distancetype Register can be either Euclidean, Manhattan or Hamming.

Figure 6:
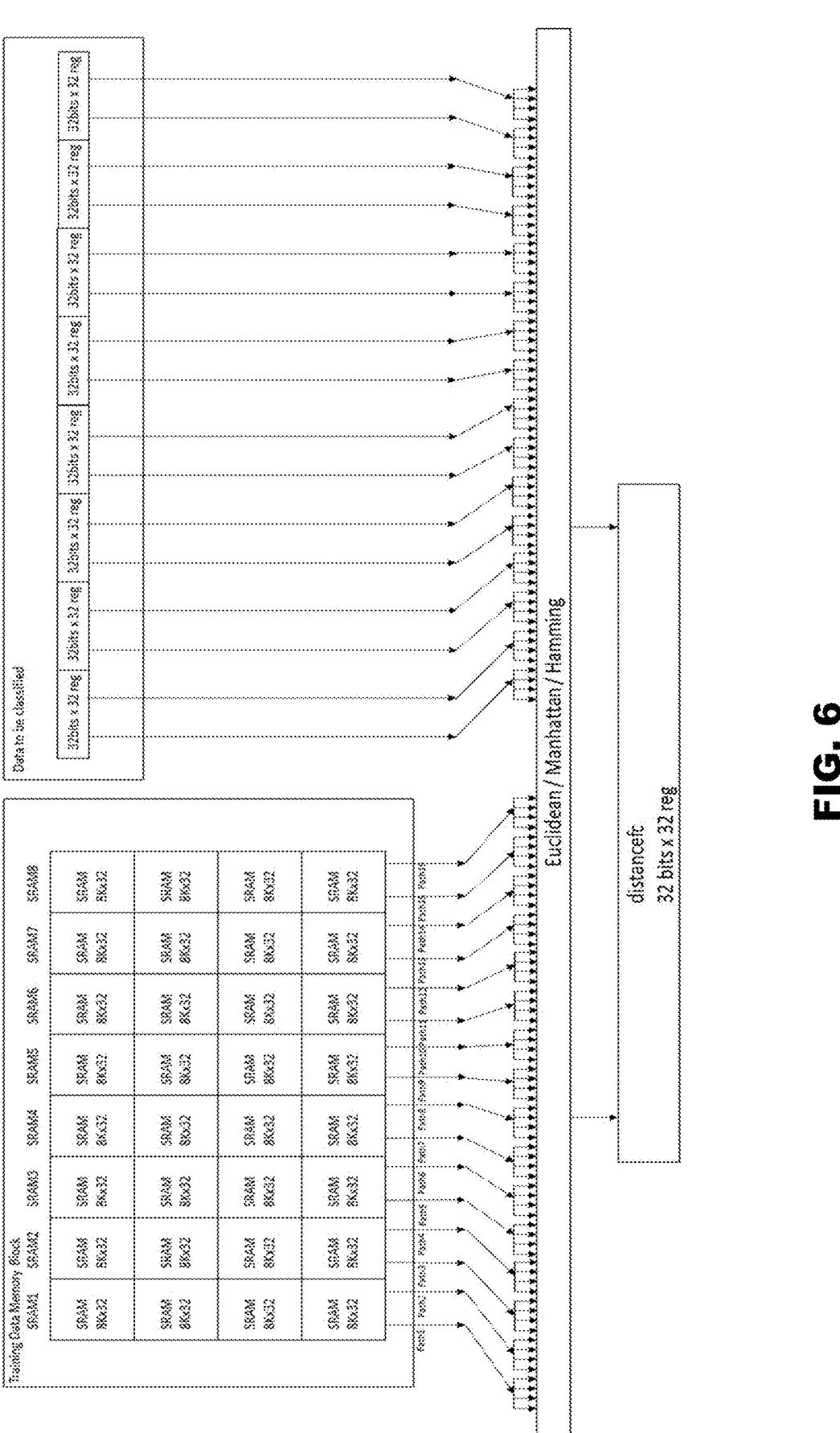
FIG. 6 illustrates architectural implementation of 64 parallel paths of Computation in accordance with a preferred embodiment of the present invention.

FIG. 5 illustrates a memory map of learning data in accordance with a preferred embodiment of the present invention. An example of learning data consisting of 1024 samples with 1024 attributes per sample is provided. This architecture is not limited to only 1024 samples but can be expanded on the addressing for higher samples for different AI applications, as well as reducing the amount of attributes per sample. For example, the architecture can be expanded to 8192 samples of 64 attributes per sample or 2048 samples of 512 attributes per sample and other combinations. FIG. 6 illustrates architectural implementation of 64 parallel paths of Computation in accordance with a preferred embodiment of the present invention. Each 32 bits of data represents 4 attributes with 8 bits of data per attribute. There are 16 parallel SRAM readout paths from 8 blocks of SRAM dual read port. Each readout path represents 4 attributes as shown in FIG. 7, thus creating a parallel readout of 64 attributes. As the design of the architecture is able to handle 1024 attributes per sample of learning data, the 64 parallel paths calculates 64 attributes per cycle. An obvious speedup of the system of the present invention is to implement an architecture using 1024 parallel paths to achieve single cycle calculation of 1024 attributes per cycle. However, this is undesirable creating too large a logic, thus a balance between die size and performance requirements for this architectural implementation, 64 parallel paths is adequate to a person skilled in the art. The architecture can be expanded or reduced parallel paths as required.

To achieve the calculation of 1024 attributes, two state machines are implemented to control the flow of logic to cycle through the calculation per blocks of 64 attributes. In application, a processor communicatively coupled to the memory block, the processor configured to implement a state machine that is configured to implement an instance of a workflow to facilitate an execution calculation distance between an input data of object to be determined and a learning data from a memory block and to sort an array of information and utilize an input K value by a user to determine a suitable result of the K-Nearest Neighbor (KNN) algorithm. While, an Artificial Intelligence communication interface communicatively coupled to the memory block and the state machine, configured to receive state machine information from the state machine and implement at least one machine learning technique to process the state machine information to determine state machine observation information regarding a behavior or a status of the state machine.

A finite-state machine (FSM), or simply a state machine, is a mathematical model used to design computer programs and digital logic circuits, among other things. A state machine can change or transition from one state to another when a condition is met. In general, for the purposes of implementation of the system of the present invention, there are two state machines. A first state machine is provided to implement a first instance of a workflow to facilitate an execution calculation distance between an input data of object to be determined and a learning data from a memory block and to sort an array of information and utilize an input K value by a user to determine a suitable result of the K-Nearest Neighbor (KNN) algorithm. The first state machine having a first plurality of work units to execute first respective computer-related actions relating to the execution calculation distance between an input data of object to be determined and a learning data from a memory block and to sort an array of information and utilize an input K value by a user to determine a suitable result of the K-Nearest Neighbor (KNN) algorithm. The first plurality of work units respectively triggered by a corresponding plurality of first state machine events and having a corresponding plurality of first state machine outcome states. Meanwhile, a second state machine is provided to implement a second instance of a workflow to facilitate an execution calculation distance between an input data of object to be determined and a learning data from a memory block and to sort an array of information and utilize an input K value by a user to determine a suitable result of the K-Nearest Neighbor (KNN) algorithm. The second state machine having a second plurality of work units to execute first respective computer-related actions relating to the execution calculation distance between an input data of object to be determined and a learning data from a memory block and to sort an array of information and utilize an input K value by a user to determine a suitable result of the K-Nearest Neighbor (KNN) algorithm. The second plurality of work units respectively triggered by a corresponding plurality of second state machine events and having a corresponding plurality of second state machine outcome states. Finally, at least one of the plurality of first state machine events in the first state machine is based on the second state machine being in one of the plurality of second state machine outcome states. Depending upon the system being modeled by the state machine, a user may select to describe the state machine by a state-state transition table or a state-condition transition table. That is, in some instances, it may be more convenient to choose a state-state transition table and in other instances it may be more convenient to choose a state-condition transition table.

Figure 8:
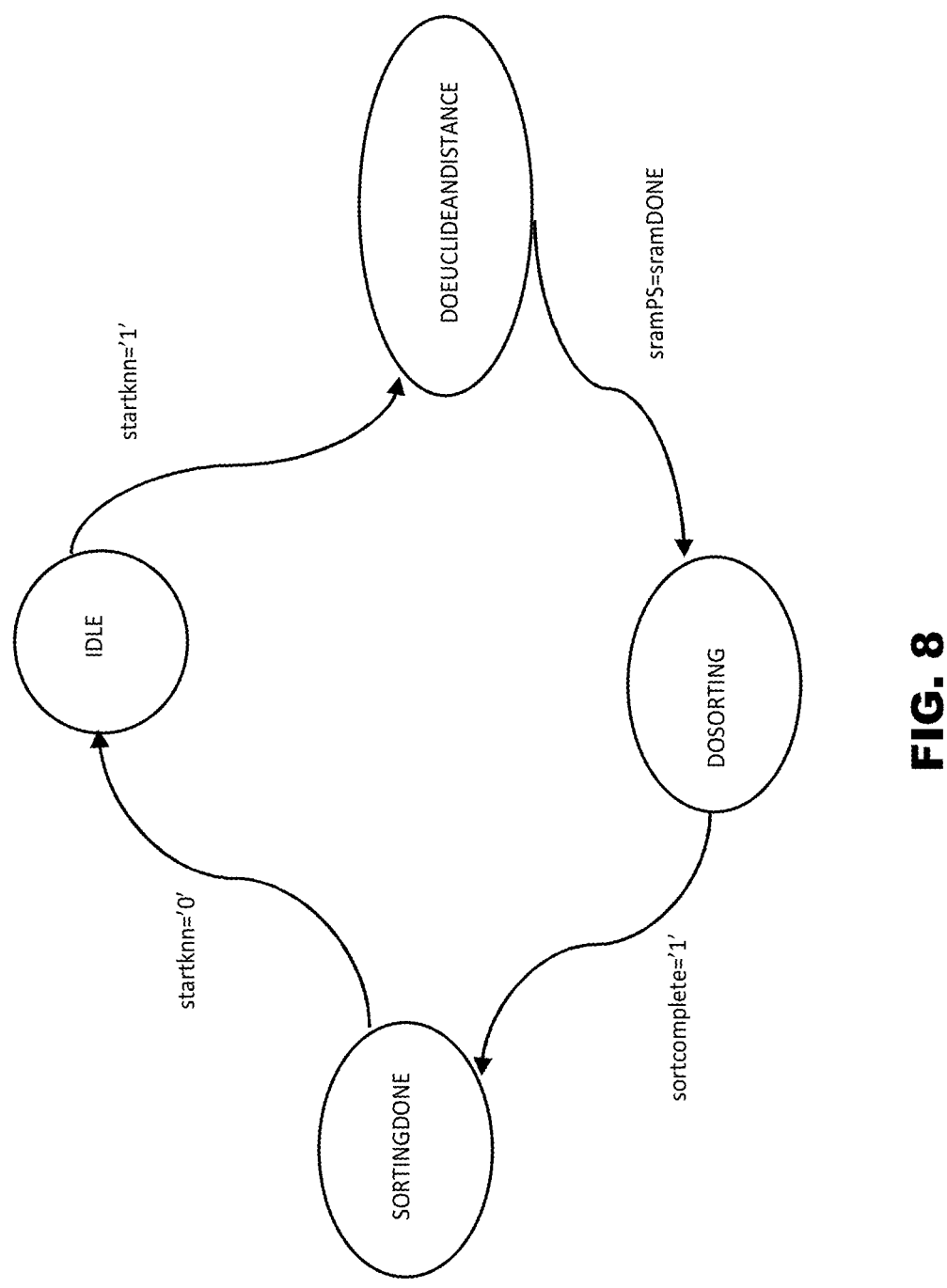
FIG. 8 illustrates a first state machine to control logic flow to achieve the process of calculation in accordance with a preferred embodiment of the present invention.
Figure 9:
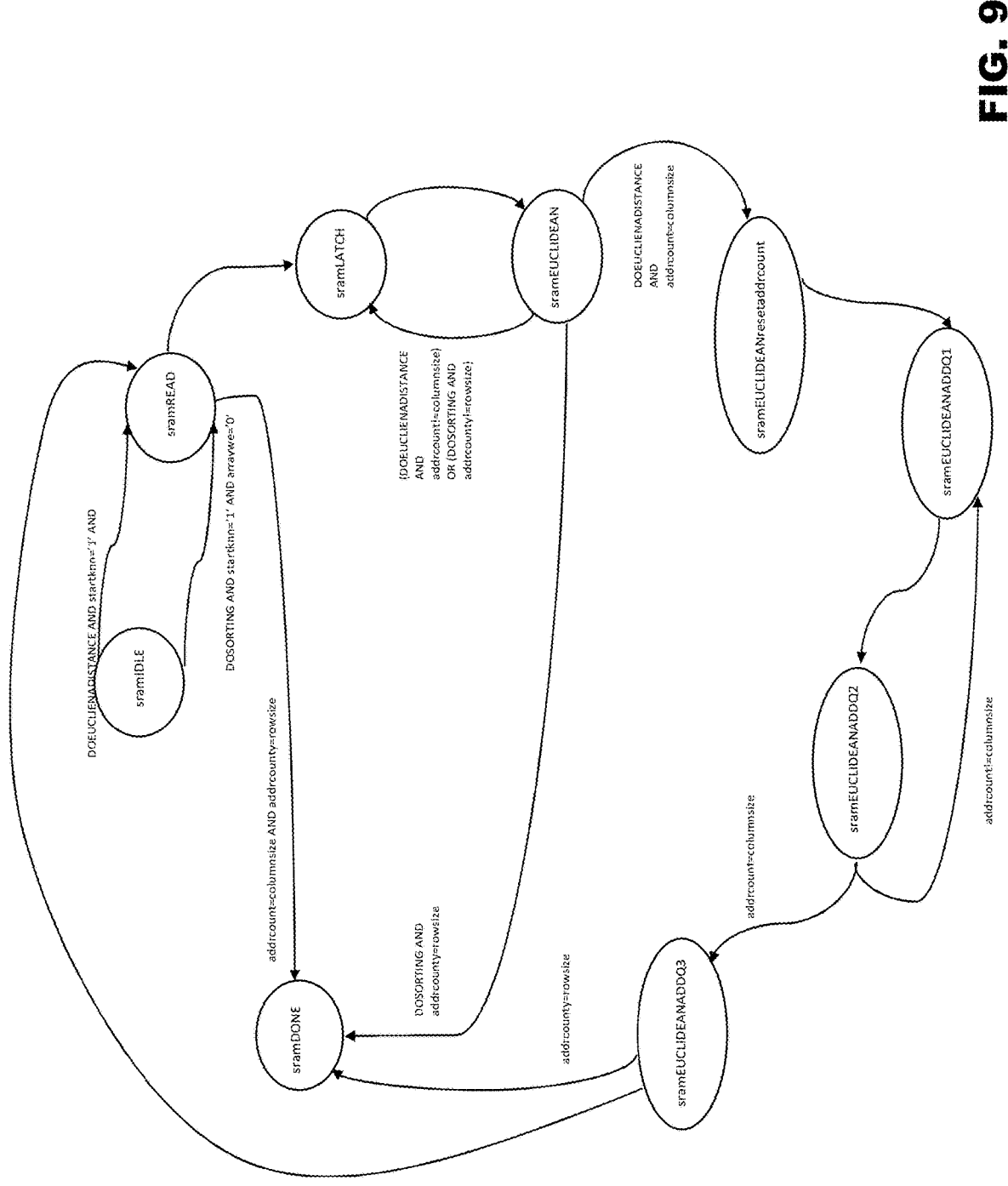
FIG. 9 illustrates a second state machine to control logic flow to achieve the process of calculation in accordance with a preferred embodiment of the present invention.

FIG. 8 illustrates a first state machine to control logic flow to achieve the process of calculation in accordance with a preferred embodiment of the present invention. FIG. 9 illustrates a second state machine to control logic flow to achieve the process of calculation in accordance with a preferred embodiment of the present invention. The two state machines shown in FIG. 8 and FIG. 9 work in tandem to do calculations per every 64 paths shown in FIG. 7. For instance, two important indicators used in the design of the present invention for controlling the state machine to flow through the attributes which is the x-dimension is called addrcount and the other is to flow through the samples which is the y-dimension is called addrcounty. This logic variable addrcount increments in multiples of 64 (the SRAM and registers shown in FIG. 6 are dual port read, thus creating 64). The logic variables addrcounty increments from one sample to another. Thus, addrcount is compared to columnsize to determine the end of the x-dimension while addrcounty is compared to rowsize to determine the end of the y-dimension.

Referring to state machine #1 in FIG. 8, when startknn='1', it transitions from IDLE to DOEUCLIDEAN-DISTANCE. It stays there until the state machine #2 in FIG. 9 in a transition to sramDONE. When state machine #1 is in DOEUCLIDEANDISTANCE, state machine #2 in FIG. 9 begins by transitioning to sramREAD. In sramREAD state, it drives the addresses of addrcount to the 8 memory blocks of the "Training Data Memory Block" and "Data To Be Classified" registers shown in FIG. 6. As the training data memory block are dual port read SRAM and the data to be classified are dual port read registers, the learning data and classification data are read through two read ports during sramLATCH. The state machine #2 subsequently transitions to sramEUCLIDEAN. During this state, the 32 attributes per calculation path as calculated (there are two calculation paths thus 64 attributes) are stored in distancefc register which is 32 bits by 32 register. There are maximum 1024 attributes with the calculation being dual read port from SRAM. Thus, this creates 32 parallel paths multipliers 2 making up 64 paths providing two results of distancefc. Thus 1024 attributes divided 32 into 32 temporary registers as required for distancefc. The register distancefc is a dual read port and a dual write port. The addrcount counter having increment and sramEUCLIDEAN loops until the addrcount counter reaches columnsize. For maximum of 1024 attributes, addrcount having increment and loops until all 1024 attributes are counted and stored into the distancefc register. It is a 32 bits×32 as 1024 attributes max with 32 attributes being calculated in parallel thus creating 32 results and distancefc has 32 temporary storage of each 32 bits. Every write to distancefc writes two results together through the dual port write, with 32 attributes calculation on one distancefc address and the other 32 attributes on the next distancefc address.

When addrcount reaches columnsize, the state machine transitions to its next cycle sramEUCLIDEANresetaddrcount which resets the addressing pointer addrcount. It then transitions to the next state sramEUCLIDEANADDQ1. During this state, the contents stored in distancefc is read 2 registers in parallel as it is dual read port and the state machine transitions to sramEUCLIDEANADDQ2. Next, the contents read from distancefc are added together with the contents of temporary distancefcadd register and then stored back into the distancefcadd register. Originally distancefcadd registers are cleared, so the first sramEUCLIDEANADDQ2 has 00 added with the first two contents of distancefc register. This process repeats whereby the state machine transitions back to sramEUCLIDEANADDQ1 and cycles to add all the contents of distancefc 32 bits×32 temporary storage into the distancefcadd register. Each loop increases addrcount until the end of distancefc register. Upon which the state machine transitions to sramEUCLIDEANADDQ3, it stores the results of distancefcadd into the distance block SRAM which is a 32 bits×1024 SRAM. The state machine then goes back to sramREAD and starts all over again. This is repeated as each loop increments addrcounty which keep tracks of how many samples have been calculated.

When addrcounty reaches rowsize or maximum 1024 samples, the state machine proceeds to sramDONE. state. When it reaches sramDONE, the distance block SRAM is filled with the contents of distancefcadd for each sample. Thus, if rowsize is 1024, all 1024 registers in distance block SRAM is written with the contents of distancefcadd for each sample. Basically, distance calculation for each sample is now stored in distance block SRAM.

When the state machine in FIG. 9 reaches to sramDONE state, the state machine in FIG. 8 is transitioned from DOEUCLIDEANDISTANCE to DOSORTING. DOSORTING is another tricky state to implement in hardware logic. The sorting process is to sort the calculated distance from smallest to largest value or from largest value to smallest value. This is costly to implement in hardware logic as for example if 1024 samples, each sample must be sorted and to form that smallest to largest or largest to smallest. To overcome this, the system of the present invention provides cycling through the 1024 samples and identifying only the smallest 16 distances. This is achieved by the state machine #1 in FIG. 8 going into DOSORTING. The state machine #2 in FIG. 9 which was used earlier during the DOEUCLIDEANDISTANCE is now reused again in DOSORTING. During sramREAD, addrcounty is driven onto address for distance block SRAM which is a dual read single write SRAM. Two distance values are read during sramLATCH and during sramEUCLIDEAN they are compared to find the smallest value. For instance, this smallest value is stored in one of the 16 smallest registers. State machine #2 moves back to sramLATCH while addrcounty increments and it loops to read more values of distance from the distance SRAM block to determine more of the 16 smallest registers. In the sorting logic module, instead of doing a sort from ascending order or descending order, the implementation scans through and during first cycle, the smallest of the two distance values are stored as smallest.

The next two values are compared between them with the smallest value is determined based on a first smallest value and a second smallest value. This process repeats itself for all 1024 samples and the storage of up to 16 smallest distance with smallest, $2^{nd}$ smallest, $3^{rd}$ smallest till $16^{th}$ smallest are identified. By using this method it is possible to implement the sorting of 1024 sample's distance and to use the 16 smallest distance to determine the result of the output of the KNN algorithm by counting how many of the samples have the most same class reference based on value of K. Using this method, the value of K is 4 bits (binary 0000 to binary 1111) as there is 16 smallest. If the value of K increases to 5 bits (binary 00000 to binary 11111), then the sorting hardware design can be expanded to find and store the 32 smallest distance.

Figure 10:
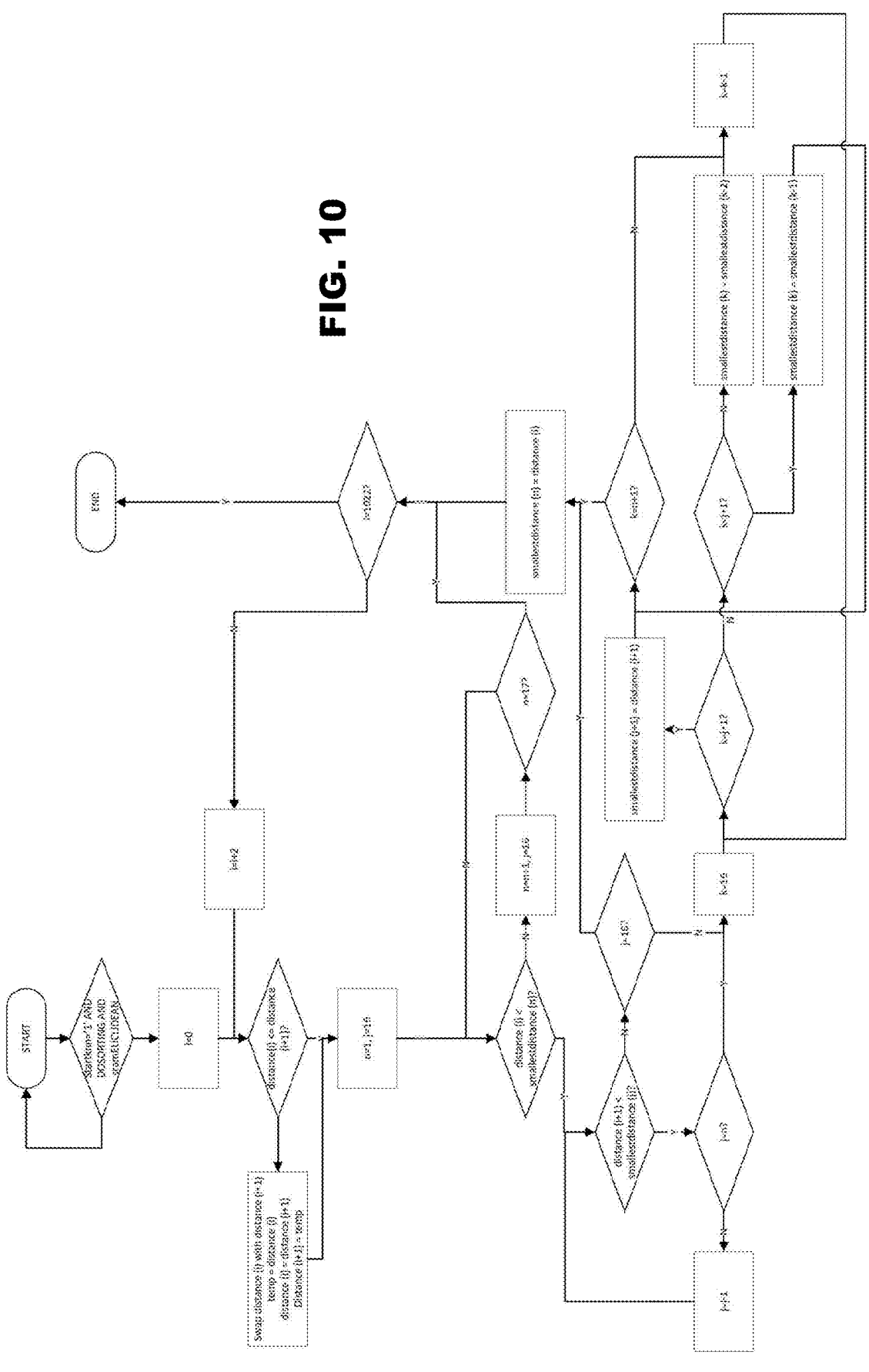
FIG. 10 illustrates a sorting logic flow to sort an array of information generated from the learning data and to utilize an input K value provided by the user to determine a most suitable result of K-Nearest Neighbor (KNN) algorithm in accordance with a preferred embodiment of the present invention.

FIG. 10 illustrates a sorting logic flow to sort an array of information generated from the learning data and to utilize an input K value provided by the user to determine a most suitable result of K-Nearest Neighbor (KNN) algorithm in accordance with a preferred embodiment of the present invention. This implementation method allows for the determination of the smallest distance without a need to sort the entire 1024 samples in ascending order or descending order which requires too much logic implementation.

Referring now to FIG. 10, during DOSORTING, in sramEUCLIDEAN, the sorting flow starts with i=0 and compared distance (i) with distance (i+1).

a. If distance (i) is smaller or equal to distance (i+1), distance (i) is compared to smallestdistance register.

b. If distance (i) is smaller than smallestdistance in (a), the sorting flow compares distance (i+1) with a loop for all 16 smallestdistances beginning from $16^{th}$ smallestdistance.

c. In (b) if distance (i+1) is smaller than some of the 16 smallestdistance, for example if distance (i+1) is smaller than $16^{th}$ smallestdistance, $15^{th}$ smallestdistance and $14^{th}$ smallestdistance, it goes through the flow to assign the following i. $16^{th}$ smallestdistance=$14^{th}$ smallestdistance ii. $15^{th}$ smallestdistance=distance (i+1)

iii. $14^{th}$ smallestdistance=$13^{th}$ smallestdistance iv. $13^{th}$ smallestdistance=$12^{th}$ smallestdistance v. $12^{th}$ smallestdistance=$11^{th}$ smallestdistance vi. $11^{th}$ smallestdistance=$10^{th}$ smallestdistance vii. $10^{th}$ smallestdistance=$9^{th}$ smallestdistance viii. $9^{th}$ smallestdistance=$8^{th}$ smallestdistance ix. $8^{th}$ smallestdistance=$7^{th}$ smallestdistance x. $7^{th}$ smallestdistance=$6^{th}$ smallestdistance xi. $6^{th}$ smallestdistance=$5^{th}$ smallestdistance xii. $5^{th}$ smallestdistance=$4^{th}$ smallestdistance xiii. $4^{th}$ smallestdistance=$3^{rd}$ smallestdistance xiv. $3^{rd}$ smallestdistance=$2^{nd}$ smallestdistance xv. $2^{nd}$ smallestdistance=smallestdistance xvi. smallestdistance=distance (i)

d. In (b), another example if distance (i+1) is smaller than $16^{th}$ smallest distance, $15^{th}$ smallestdistance, $14^{th}$ smallest distance and $13^{th}$ smallestdistance, it goes through the flow to assign the following i. $16^{th}$ smallestdistance=$14^{th}$ smallestdistance ii. $15^{th}$ smallestdistance=$13^{th}$ smallestdistance iii. $14^{th}$ smallestdistance=distance (i+1)

iv. $13^{th}$ smallestdistance=$12^{th}$ smallestdistance v. $12^{th}$ smallestdistance=$11^{th}$ smallestdistance vi. $11^{th}$ smallestdistance=$10^{th}$ smallestdistance vii. $10^{th}$ smallestdistance=$9^{th}$ smallestdistance viii. $9^{th}$ smallestdistance=$8^{th}$ smallestdistance ix. $8^{th}$ smallestdistance=$7^{th}$ smallestdistance x. $7^{th}$ smallestdistance=$6^{th}$ smallestdistance xi. $6^{th}$ smallestdistance=$5^{th}$ smallestdistance xii. $5^{th}$ smallestdistance=$4^{th}$ smallestdistance xiii. $4^{th}$ smallestdistance=$3^{rd}$ smallestdistance xiv. $3^{rd}$ smallestdistance=$2^{nd}$ smallestdistance xv. $2^{nd}$ smallestdistance=smallestdistance xvi. smallestdistance=distance (i)

e. In (a), if distance (i) is not smaller than smallestdistance and instead is smaller than $2^{nd}$ smallestdistance, from the flow chart, n=2, the sorting flow compares distance (i+1) with a loop for all 16 smallestdistance beginning from $16^{th}$ smallestdistance. An example if distance (i+1) is smaller than $16^{th}$ smallest distance, $15^{th}$ smallestdistance $14^{th}$ smallest distance and $13^{th}$ smallestdistance, it goes through the flow to assign the following i. $16^{th}$ smallestdistance=$14^{th}$ smallestdistance ii. $15^{th}$ smallestdistance=$13^{th}$ smallestdistance iii. $14^{th}$ smallestdistance=distance (i+1)

iv. $13^{th}$ smallestdistance=$12^{th}$ smallestdistance v. $12^{th}$ smallestdistance=$11^{th}$ smallestdistance vi. $11^{th}$ smallestdistance=$10^{th}$ smallestdistance vii. $10^{th}$ smallestdistance=$9^{th}$ smallestdistance viii. $9^{th}$ smallestdistance=$8^{th}$ smallestdistance ix. $8^{th}$ smallestdistance=$7^{th}$ smallestdistance x. $7^{th}$ smallestdistance=$6^{th}$ smallestdistance xi. $6^{th}$ smallestdistance=$5^{th}$ smallestdistance xii. $5^{th}$ smallestdistance=$4^{th}$ smallestdistance xiii. $4^{th}$ smallestdistance=$3^{rd}$ smallestdistance xiv. $3^{rd}$ smallestdistance=$2^{nd}$ smallestdistance xv. $2^{nd}$ smallestdistance=distance (i)

f. The sorting flowchart cycles through from i=0 to i=1023 for all 1024 calculated values of distance SRAM block, each time comparing i=0 and i=1, followed by i=2 and i=3, followed by i=4 and i=5, until i=1022 and i=1023. Each cycle involves checking of distance (i), distance (i+1) with the 16 smallestdistance registers to determine the new values of these 16 smallestdistance.

Referring to (a), if distance (i+1) is smaller than distance (i), then the flow chart swaps both distance (i) and distance (i+1) and run through the flow as usual but now with the values of distance (i) and distance (i+1) are swapped.

By using the flowchart shown in FIG. 10, an efficient design is implemented in Application-specific integrated circuit (ASIC) using logic gates, registers and SRAM to achieve the sorting of an entire distance SRAM block to determine 16 smallestdistance to find the result of the KNN algorithm. The KNN process may be utilized to improve the speed of classifier and recognition systems in numerous fields such as, voice recognition, image and video recognition, recommender systems, natural language processing and the like. The inventors realized that the K-NN algorithm, constructed and operative in accordance with a preferred embodiment of the present invention, may be used in fields where it was not used before as it provides a superior computation complexity of O(1). It will be appreciated that the addition of the K-NN algorithm may provide a high classification accuracy with partially trained neural networks while dramatically reducing the training period time.

As distance SRAM block is sorted using the 16 smallest distance method as described, the corresponding distancepos SRAM block and classstorage SRAM block is sorted as well by following the sorting of the distance SRAM block. For example, if distance (32) is the smallestdistance, the corresponding distancepos (32) and classtorage (32) is shifted to be the distancepos for smallestdistance and classstorage for smallestdistance. If distance (128) is the $2^{nd}$ smallestdistance, its corresponding distancepos (128) and classtorage (128) is shifted to be the distancepos for $2^{nd}$ smallestdistance and classtorage for $2^{nd}$ smallestdistance.

All 16 smallestdistance have its corresponding classtorage and its corresponding distancepos. When DOSORTING is completed as illustrated in FIG. 8, the value of K determines how many of these classtorage of the 16 smallestdistance have the most counts and the output result identifies which class of the data to be classified is nearest to. The Sorting Logic flow shown in FIG. 10 is not limited to only 16 smallest distance. It can be expanded to more, for example if the design is to cater to the value of K input of 1 to 32, then the design is expanded to find the smallest 32 distances. The Sorting Logic flow as illustrated in FIG. 10 is changed to find the smallest 32 distances by changing the following:

a. Change A in FIG. 10 from n=1, j=16 to n=1, j=32 b. Change B in FIG. 10 from n=n+1, j=16 to n=n+1, j=32 c. Change C in FIG. 10 from n=17 to n=33 d. Change D in FIG. 10 from k=16 to k=32 e. Change E in FIG. 10 from j=16 to j=32

Figure 11:
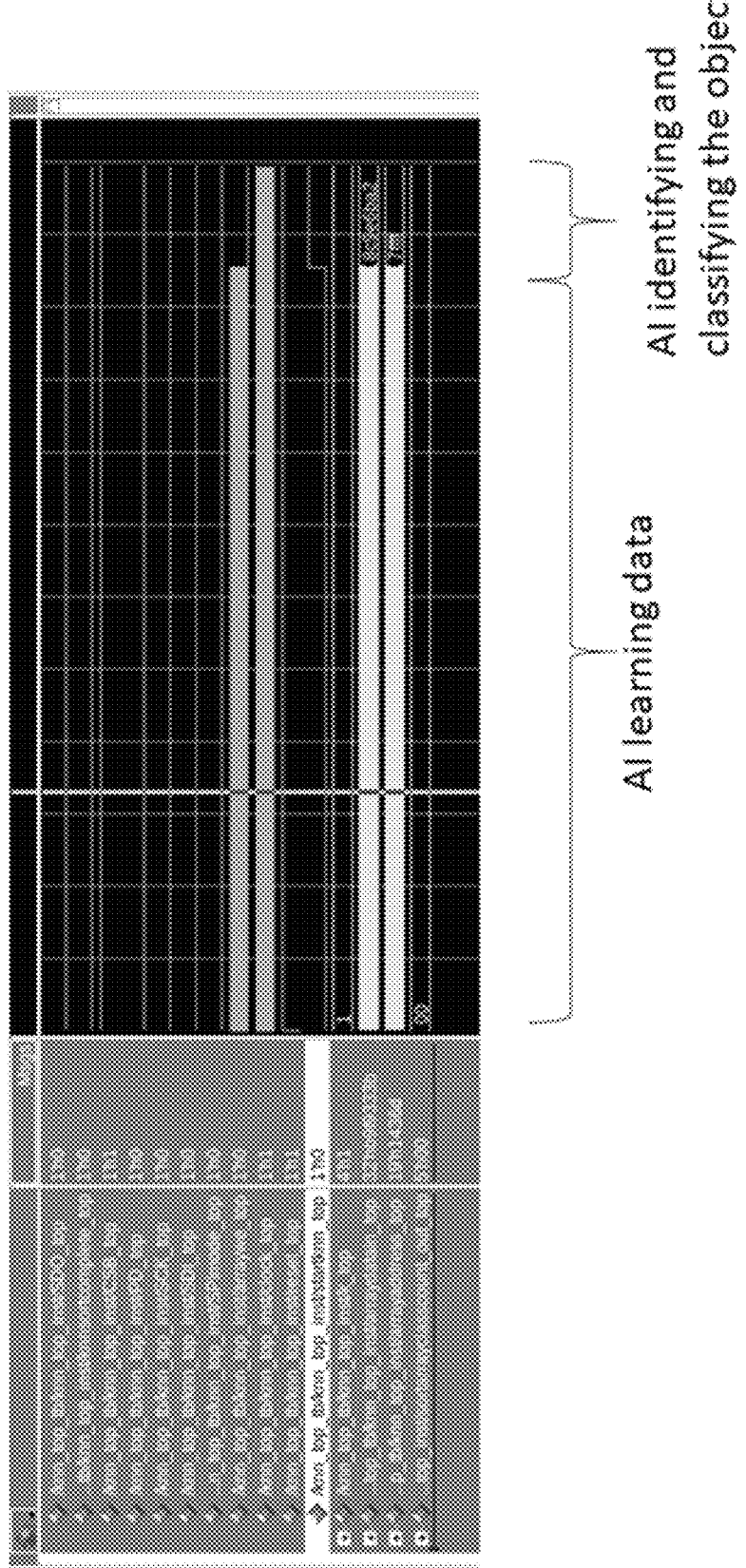
FIG. 11 illustrates a diagram of an AI ASIC chip simulation of learning data and identifying object in accordance with a preferred embodiment of the present invention.
Figure 12:
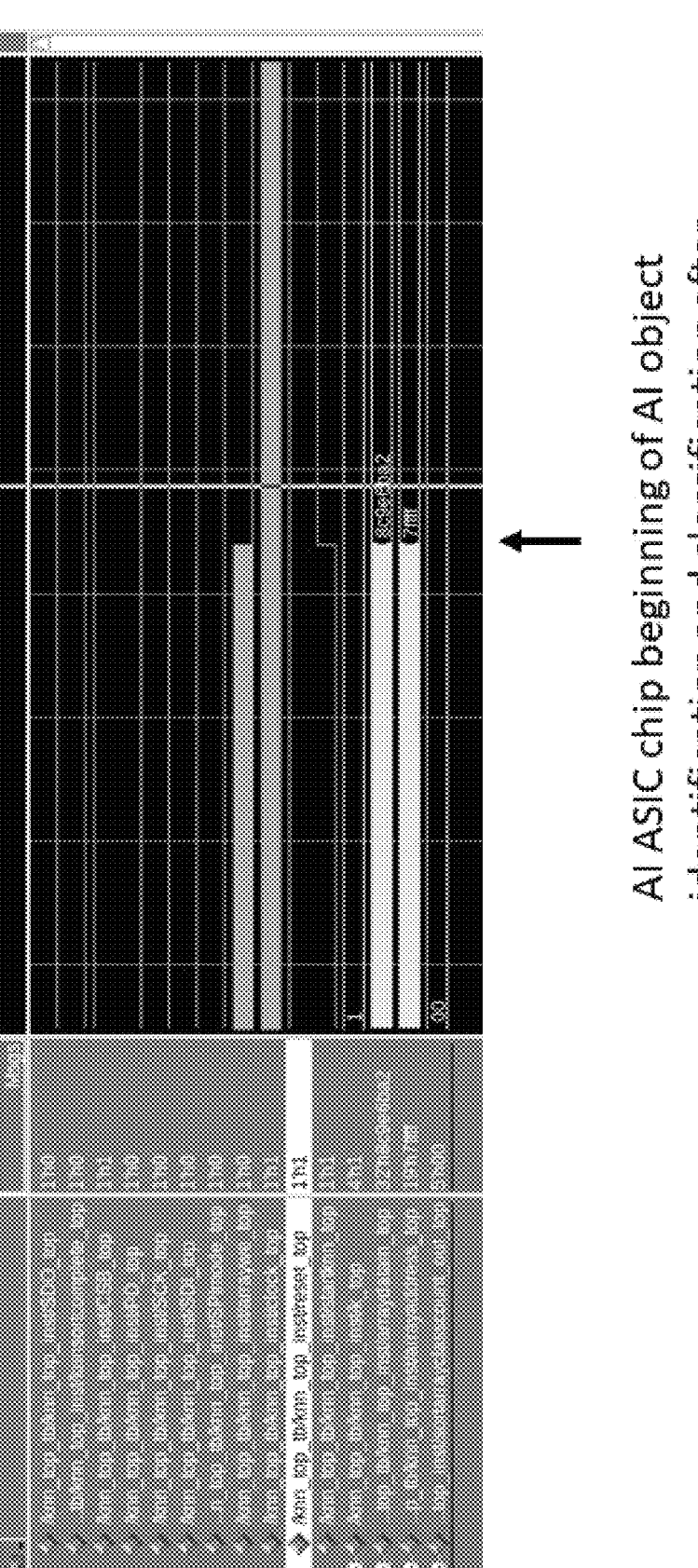
FIG. 12 illustrates a simulation on the completion of learning and beginning of process of identifying and classifying the data of AI ASIC Chip Simulation Start of Process of Object Identification and Classification in accordance with a preferred embodiment of the present invention.
Figure 13:
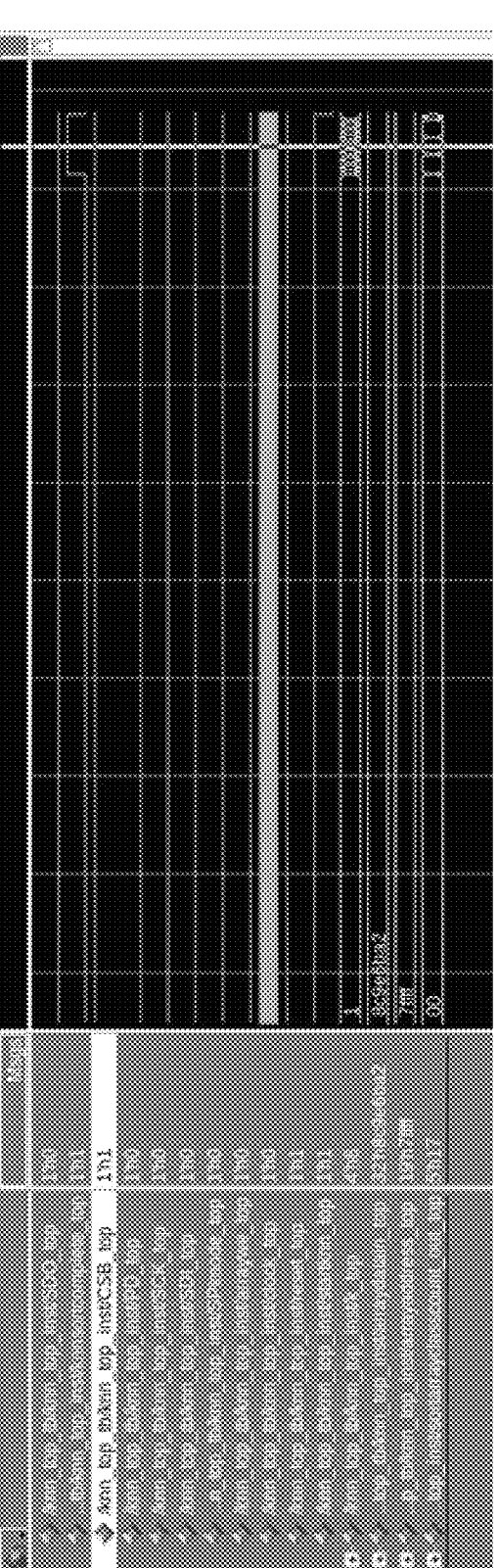
FIG. 13 illustrates a simulation on the completion of identifying and classifying the data with the results generated on the object classified of AI ASIC Chip Simulation Start of Process of Object Identification and Classification in accordance with a preferred embodiment of the present invention.

FIG. 11 illustrates a diagram of an AI ASIC chip simulation of learning data and identifying object in accordance with a preferred embodiment of the present invention. While FIG. 12 illustrates a simulation on the completion of learning and beginning of process of identifying and classifying the data of AI ASIC Chip Simulation Start of Process of Object Identification and Classification in accordance with a preferred embodiment of the present invention. FIG. 13 illustrates a simulation on the completion of identifying and classifying the data with the results generated on the object classified of AI ASIC Chip Simulation Start of Process of Object Identification and Classification in accordance with a preferred embodiment of the present invention.

The design architecture of the system of the present invention described in FIG. 1, FIG. 8, FIG. 9, FIG. 10 is applicable to application-specific integrated circuit (ASIC), system on a chip (SOC) and field-programmable gate array (FPGA). In ASIC, the implementation design is using logic gates and SRAM.

In operation, a method of the present invention begins by activating a memory array of a memory block having a learning data memory block and a classification data memory block. Next, determining learning data, attributes width of each sample learning data and choice of distance calculation in a control block by a user. This is followed by determining a threshold value for K-Nearest Neighbors (k-NN) classification. The user is required to provide input data to the memory array. Subsequently, calculating distances between input data to be determined by the user and the learning data from the memory block. Finally, sorting an array of information generated from the learning data and to utilize an input K value provided by the user to determine a most suitable result of K-Nearest Neighbor (KNN) algorithm.

The step sorting an array of information generated from the learning data and to utilize an input K value provided by the user to determine a most suitable result of K-Nearest Neighbor (KNN) algorithm further sorting from ascending order to determine a smallest of the two distance values between an input data of object to be determined and a learning data; comparing the two distance values on a first smallest value and a second smallest value; and repeating the steps of sorting and comparing until all the distance values are identified up to sixteen smallest distance value. Sixteen smallest is determined based on the input K value. If the input K value is expanded up to 32, then the smallest distance values are identified up to thirty-two smallest distance value. Once these sixteen smallest distances are determined based on input K value being 4 bits, a class array of each of these sixteen smallest distances is counted and a highest-class array count is determined as the most possible classification if the smallest distance of the highest class array count is smaller than the value in Threshold Register. For example, if K value is 5, the class array of the smallest, second smallest, third smallest, fourth smallest and fifth smallest distance are counted and the class array which occurs the most frequent is the output of the classification if the smallest distance of the highest class array count is smaller than the value in Threshold Register. Another example, if K value is 12, the class array of the smallest, second smallest to twelfth smallest distance are counted and the class array which occurs the most frequent is the output of the classification if the smallest distance of the highest class array count is smaller than the value in Threshold Register.

Alternatively, the step sorting an array of information generated from the learning data and to utilize an input K value provided by the user to determine a most suitable result of K-Nearest Neighbor (KNN) algorithm further comprising sorting from descending order to determine a smallest of the two distance values between an input data of object to be determined and a learning data; comparing the two distance values on a first smallest value and a second smallest value; and repeating the steps of sorting and comparing until all the distance values are identified up to sixteen smallest distance based on the input K value of 4 bits. If the design is expanded to have input K value of 5 bits, thus the distance values are identified up to the thirty-two smallest distance.

A processor communicatively coupled to the memory block, the processor configured to implement a state machine that is configured to implement an instance of a workflow to facilitate an execution calculation distance between an input data of object to be determined and a learning data from a memory block and to sort an array of information and utilize an input K value by a user to determine a suitable result of the K-Nearest Neighbor (KNN) algorithm. An Artificial Intelligence communication interface communicatively coupled to the memory block and the state machine, configured to receive state machine information from the state machine and implement at least one machine learning technique to process the state machine information to determine state machine observation information regarding a behavior or a status of the state machine.

Figure 14:
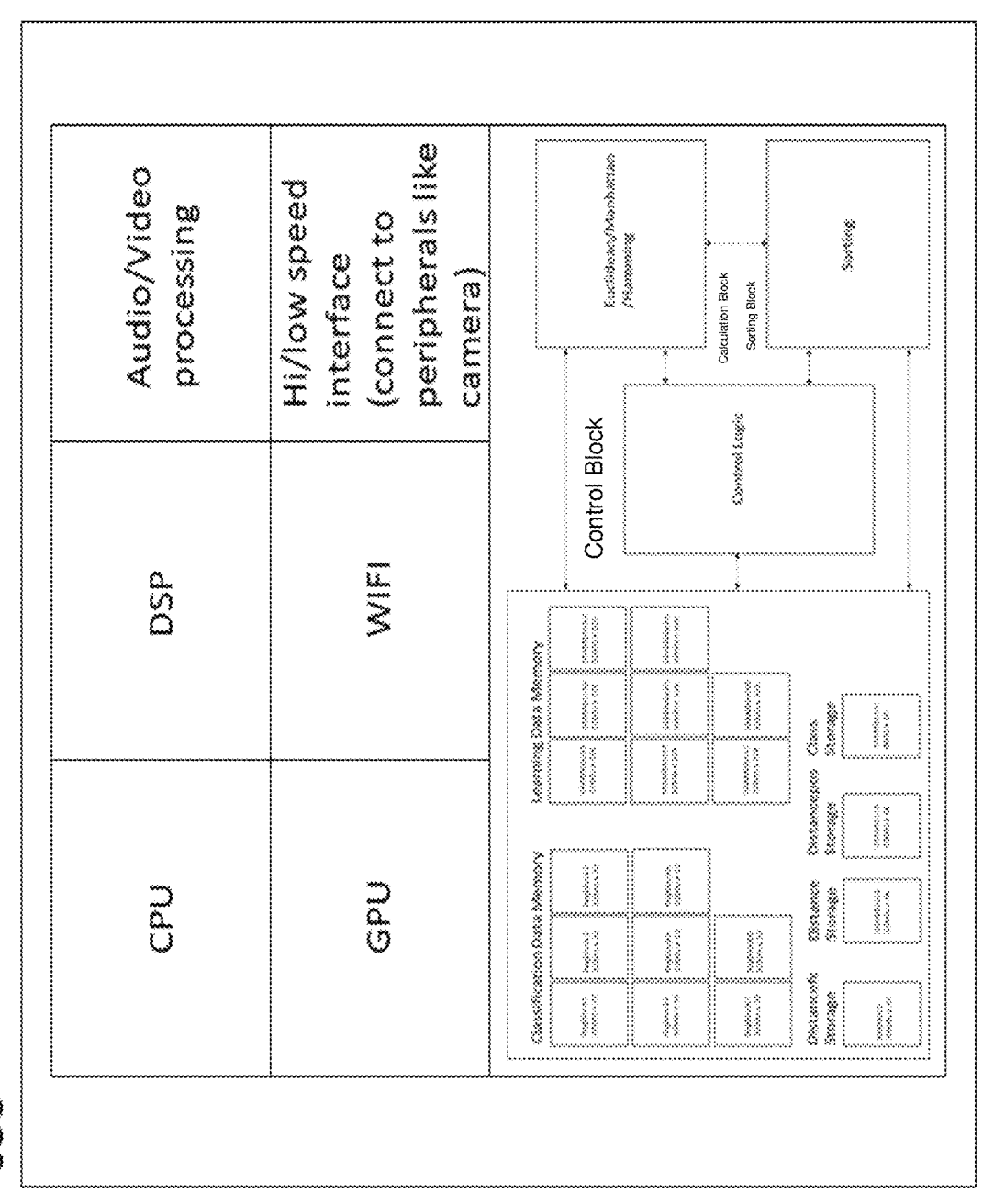
FIG. 14 illustrates a system on a chip (SOC) utilizes a system in accordance with a preferred embodiment of the present invention.

The design is used as an intellectual property (IP) integrated with other periphery to form SOC chip. A SOC chip is a chip consisting of several different IPs integrated together to form a system on a chip. An example is shown in FIG. 14 where a microprocessor and other periphery is integrated with the proposed AI design IP and form a SOC. In accordance with one particular embodiment, a system on a chip (SOC) or like architecture is implemented including, or in other words integrating, both hardware and software on a single integrated circuit substrate. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system and/or associated functionality can be embedded within hardware in a SOC architecture. Such SOC is also fabricated and used in the user system with large volume. For SOC, the user can integrate our design (not chip but rather use the system of the present invention either in RTL format or gate level format or physical layout format of a fabrication technology node) into the design and build a SOC with one of the blocks in the SOC being the system of the present invention.

As the proposed design is fully logic and SRAM implementation, it can also be integrated into an FPGA. However since FPGA are limited in SRAM, memory elements and logic elements, the proposed design of the system of the present invention uses significantly less learning data samples, for example 100 learning data samples with 128 attributes per sample design have been tested on a Xilinx Zynq ZCU104 (20% utilization), Xilinx Pynq Z2 (73% utilization) and Altera Artix 7 XC7A200T (30% utilization). Cost of FPGA increases significantly as the amount of logic elements and memory elements increases, for example a low cost Cyclone IV E EP4CE6E22I7N FPGA with 6272 logic elements cost around USD 18 (RM75) (https://www-.digikey.my/product-detail/en/intel/EP4CE6E22I7N/544-2654-ND/2295894) which can fit around 5 learning data samples of 1024 attributes each learning sample, while a higher end Atix 7 XC7A200T-1FBG484C FPGA with 215360 logic element cost around USD 200 (RM807) (https://www.digikey.my/product-detail/en/xilinx-inc/XC7A200T-1FBG484C/122-1871-ND/3925796) which can fit around 100 learning data samples of 1024 attributes.

Figure 15:
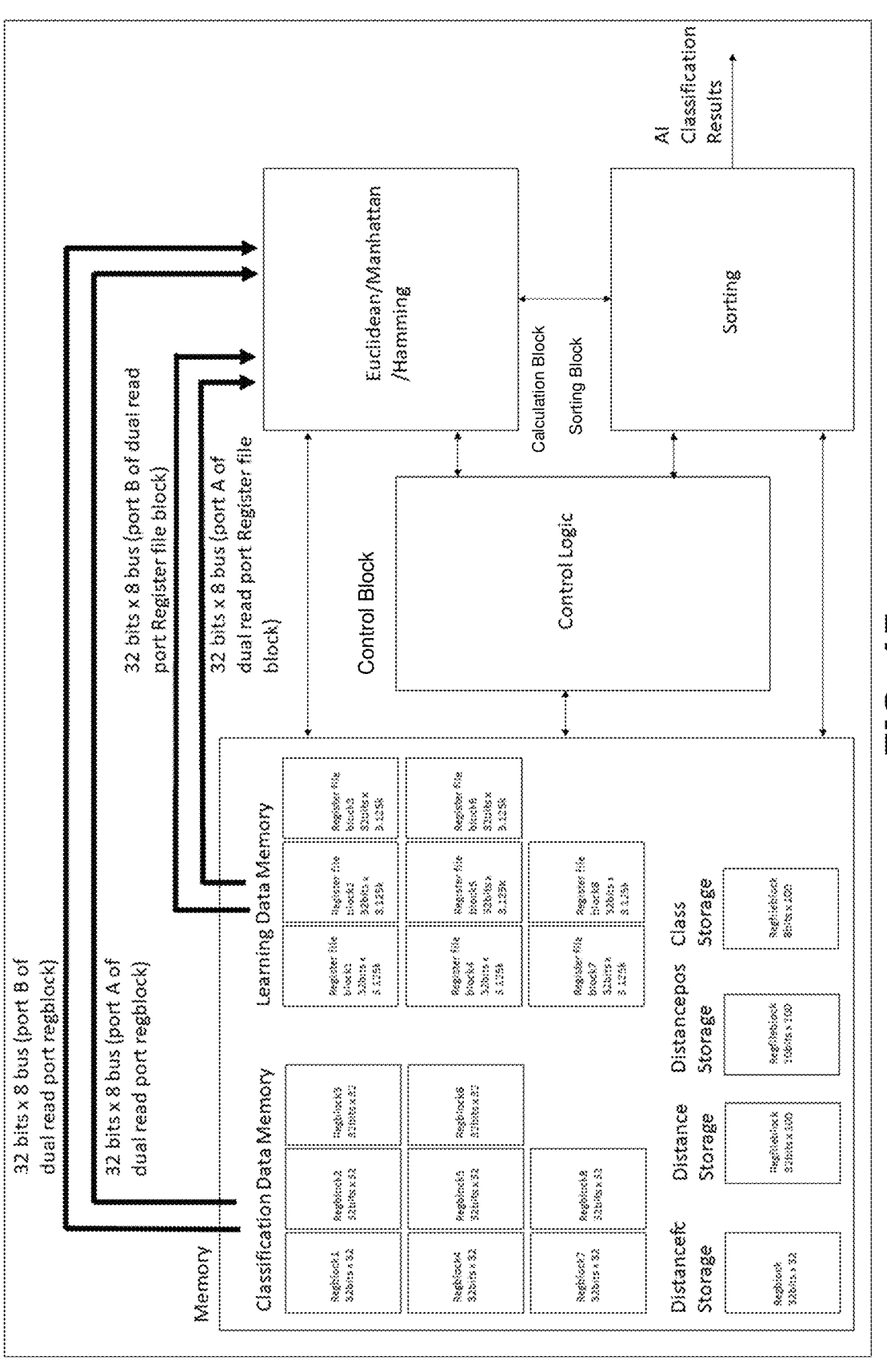
FIG. 15 illustrates a Field-programmable gate array (FPGA) utilizes a scaled down 100 Learning Data of a system in accordance with a preferred embodiment of the present invention.

FIG. 15 illustrates a Field-programmable gate array (FPGA) utilizing a scaled down 100 Learning Data of a system in accordance with a preferred embodiment of the present invention. The proposed AI design can be scaled down to 100 learning data samples with each data sample being 128 attributes and integrated into FPGA. For larger learning data samples or larger attributes per sample, bigger FPGA can be used. For FPGA, the learning data and classification data memory can be implemented using register blocks or register files utilizing FPGA logic elements.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage medium that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

The foregoing detailed description and examples are merely illustrative of the preferred embodiments. They are by no means meant to be the exclusive description of the inventive concept hereby disclosed. It will be recognized by one of ordinary skill in the art that certain aspects of the practice of the invention are readily susceptible to modification or practice by alternative, known means.

The invention claimed is:

1. A system implemented using logic gates and static random access memory (SRAM) to optimize power consumption and computational efficiency comprising:
   a memory block having a memory array for storing training data and intermediate calculation data;
   wherein the memory array further comprises
      a learning data memory block for storing learning data and a corresponding object for identification of the learning data; and
      a classification data memory block for storing classification data;
   a calculation block implementing a K-Nearest Neighbor (KNN) algorithm logic to calculate distances between input data to be determined by a user and the learning data from the memory block, wherein the calculated distances are stored in the memory block;
   a sorting block configured to sort an array of information generated from the learning data and to utilize an input K value provided by the user to determine a most suitable result of a K-Nearest Neighbor (KNN) algorithm; and
   a control block having a plurality of control registers for allowing the user to control the learning data;
   wherein the calculation block computes distances in parallel across segmented vector dimensions using a hardware pipeline optimized for SRAM access patterns, and
   wherein the sorting block implements partial sorting via iterative pairwise comparisons to identify K-nearest neighbors without full sorting.

2. The system as claimed in claim 1, wherein the memory array further comprises:
   a distance storage memory block for temporarily storing calculated distances for each of a plurality of samples;
   a distance storage register memory block for temporarily storing attribute calculation results;
   a distance position of the memory block for temporarily storing positions of calculated distances for each of the samples; and
   a class storage memory block for temporarily storing a classification label for each of corresponding samples.

3. The system as claimed in claim 1, wherein the calculation block supports multiple distance metrics including Euclidean, Manhattan, and Hamming distances, with user-configurable selection via control registers and wherein the distance metrics are computed simultaneously in parallel hardware paths to reduce latency compared to sequential metric calculation.

4. The system as claimed in claim 1, wherein the sorting block determines smallest K distances from the calculated distances and assigns classifications based on a most frequent classification among-K nearest neighbors and wherein the sorting block terminates comparisons once K-nearest neighbors are identified, avoiding full sorting of all distances.

5. A method for classifying input data using a hardware-implemented K-Nearest Neighbor (KNN) algorithm, the method comprising:

activating by a hardware processor, a memory array of a memory block, the memory array including a learning data memory block and a classification data memory block;
receiving by the hardware processor, learning data and user-configurable parameters including attribute width and a distance calculation method;
determining by the hardware processor, a threshold value for K-Nearest Neighbors (k-NN) classification;
providing input data to the memory array;
calculating by the hardware processor, distances between input data and stored learning data using a selected distance metric;
sorting by the hardware processor, the calculated distances to identify K-nearest distances;
determining by the hardware processor, a classification of the input data based on a most frequent classification among K-nearest neighbors; and
outputting by the hardware processor, a classification result to a user;
wherein the calculating, sorting, and determining steps are executed by dedicated hardware circuits including:
a parallel distance calculation pipeline; and
a threshold-filtered partial sorting circuit.

6. The method as claimed in claim 5, wherein the calculating distances is performed using parallel processing across multiple computation paths to reduce classification time.

7. The method as claimed in claim 5, wherein the sorting step utilizes a hardware-optimized logic circuit to extract smallest K distances without requiring a full sorting operation.

8. The method as claimed in claim 5, wherein classification accuracy is enhanced by applying a threshold-based filtering mechanism to ignore outlier classifications.

9. The method as claimed in claim 8, wherein the method is implemented using a combination of logic gates and SRAM to achieve low power consumption and high processing speed.

10. A non-transitory computer readable storage medium including instructions that, when executed by one or more processors, cause the one or more processors to perform operations comprising:
   activating a memory array of a memory block, the memory array including a learning data memory block and a classification data memory block;
   receiving learning data and user-configurable parameters, including attribute width and a distance calculation method;
   determining a threshold value for K-Nearest Neighbors (k-NN) classification;
   providing input data to the memory array;
   calculating distances between the input data and stored learning data using a selected distance metric;
   sorting the calculated distances to identify K-Nearest distances;
   determining a classification of the input data based on a most frequent classification among K-nearest neighbors; and
   outputting a classification result to a user,
wherein the instructions, when executed, configure the processor to:
   generate a configurable number of parallel computation paths to adapt to variable input dimensions; and
   store intermediate results in a dedicated distance memory block to minimize data movement.

11. The non-transitory computer readable storage medium according to claim 10, wherein the configurable number of parallel computation paths is between 32 and 128.

\* \* \* \* \*